United States Patent
Chiu (10) Patent No.: US 7,239,243 B2
(45) Date of Patent: Jul. 3, 2007

(54) RFID TAG IMAGER

(75) Inventor: Lihu M. Chiu, Arcadia, CA (US)

(73) Assignee: Printronix, Inc., Irvine, CA (US)

( * ) Notice: Subject to any disclaimer, the term of this patent is extended or adjusted under 35 U.S.C. 154(b) by 234 days.

(21) Appl. No.: 11/072,060

(22) Filed: Mar. 4, 2005

(65) Prior Publication Data

US 2006/0212241 A1 Sep. 21, 2006

(51) Int. Cl.
*G08B 13/14* (2006.01)
*G01R 23/00* (2006.01)

(52) U.S. Cl. ............................... 340/572.1; 340/572.4; 702/75; 343/703

(58) Field of Classification Search ............. 340/572.1, 340/572.4, 572.5, 572.7, 551, 552; 343/703, 343/852; 702/75, 81; 324/652, 655, 656, 324/658, 663, 667, 668; 716/1–4, 21; 455/63.1–63.4, 455/67.11–67.16

See application file for complete search history.

(56) References Cited

U.S. PATENT DOCUMENTS

| | | | | |
|---|---|---|---|---|
| 6,070,803 A | * | 6/2000 | Stobbe | 235/492 |
| 6,480,110 B2 | * | 11/2002 | Lee et al. | 340/572.5 |
| 6,889,036 B2 | * | 5/2005 | Ballweber et al. | 455/292 |
| 7,132,946 B2 | * | 11/2006 | Waldner et al. | 340/572.1 |
| 2006/0202032 A1 | * | 9/2006 | Kricorissian | 235/435 |

\* cited by examiner

*Primary Examiner*—Toan N. Pham
(74) *Attorney, Agent, or Firm*—Jonathan W. Hallman; MacPherson Kwok Chen & Heid LLP (57) ABSTRACT

In one embodiment, a system for obtaining an image of an RFID tag comprising a transponder and a tag antenna is provided, the system comprising: a plurality of inductors, each inductor being associated with a capacitor to form a resonant tank circuit, wherein each resonant tank circuit has a first resonant frequency in the presence of metal and a second resonant frequency in the absence of metal; a signal processor configured to determine a resonant frequency for each resonant tank circuit in the presence of the tag antenna; and a processor configured to compare the resonant frequency of each resonant tank circuit to the first and second resonant frequency to determine an image of the tag antenna.

15 Claims, 8 Drawing Sheets

RFID TAG IMAGER

RELATED APPLICATIONS

This application is related to U.S. patent application Ser. Nos. 11/073,042 and 11/072,838, both concurrently filed herewith, the contents of both applications being hereby incorporated by reference in their entirety.

FIELD OF THE INVENTION

This invention relates to RFID applications. More particularly, the present invention is directed to RFID tag imaging.

BACKGROUND OF THE INVENTION

Radio Frequency Identification (RFID) systems represent the next step in automatic identification techniques started by the familiar bar code schemes. Whereas bar code systems require line-of-sight (LOS) contact between a scanner and the bar code being identified, RFID techniques do not require LOS contact. This is a critical distinction because bar code systems often need manual intervention to ensure LOS contact between a bar code label and the bar code scanner. In sharp contrast, RFID systems eliminate the need for manual alignment between an RFID tag and an RFID reader or interrogator, thereby keeping labor costs at a minimum. In addition, bar code labels can become soiled in transit, rendering them unreadable. Because RFID tags are read using RF transmissions instead of optical transmissions, such soiling need not render RFID tags unreadable. Moreover, RFID tags may be written to in write-once or write-many fashions whereas once a bar code label has been printed further modifications are impossible. These advantages of RFID systems have resulted in the rapid growth of this technology despite the higher costs of RFID tags as compared to a printed bar code label.

Although RFID systems offer certain advantages over traditional bar code schemes their use is also not without concerns. One such concern is radiations, such as those of an electric signal, emitted by RFID tags when made operational. Generally, in a RFID system, an RFID tag includes a transponder and a tag antenna, and communicates with an RFID transceiver pursuant to the receipt of a signal, such as an interrogation or encoding signal, from the RFID transceiver. The signal causes the RFID transponder to emit via the tag antenna a signal, such as an identification or encoding verification signal, that is received by the RFID transceiver. In passive RFID systems, the RFID tag has no power source of its own and therefore the interrogation signal from the RFID transceiver also provides operating power to the RFID tag.

A concern in the foregoing approach is when numerous RFID tags are within range of each other while a signal is transmitted from a transceiver to one of the RFID tags. This concern becomes particularly acute during the initial encoding of the RFID tags, where an often large number of RFID tags are juxtaposed in an assembly line fashion during manufacturing. In this setting, the encoding signal from a transceiver to an intended recipient transponder can cause the intended transponder to generate electric fields, such as dipole fields, which in turn would excite the tag antenna in the intended RFID tag to transmit encoding and operating radiations to adjacent RFID tags. The adjacent RFID tags will then in turn become operational and encoded with the information intended for the recipient transponder, thus detrimentally overwriting the adjacent tags' previous encoding. This results in one or more of the adjacent RFID tags to have the same identification information as the intended RFID tag, and thus become distinguishable from each other during future usage. In addition, the information encoded on the intended recipient transponder will also be overwritten in the same manner once the transceiver begins encoding of the next adjacent RFID tag.

Since the direction and magnitude of the signal transmitted by the tag antenna depends on the geometric shape of the RFID tag, such as the shape of the antenna and its orientation relative to the transponder, it is desirable for the transceiver to be provided with an image of the intended RFID tag prior to transmitting encoding signals. Based on the provided image, available safeguards for reducing the adverse radiation interference of an intended RFID tag with adjacent RFID tags (and vice versa) can then be invoked during encoding. In addition, based on the provided image, it can be more readily identified if an RFID tag is placed at a less than ideal orientation in respect to the transceiver, such as during the encoding process.

Accordingly, there is a need in the art for obtaining an image of an RFID tag for use by the RFID system.

SUMMARY OF THE INVENTION

In accordance with an aspect of the invention, a system for obtaining an image of an RFID tag comprising a transponder and a tag antenna includes: a plurality of inductors, each inductor being associated with a capacitor to form a resonant tank circuit, wherein each resonant tank circuit has a first resonant frequency in the presence of metal and a second resonant frequency in the absence of metal; a signal processor configured to determine a resonant frequency for each resonant tank circuit in the presence of the tag antenna; and a processor configured to compare the resonant frequency of each resonant tank circuit to the first and second resonant frequency to determine an image of the tag antenna.

In accordance with another aspect of the invention, a method for obtaining an image of an RFID tag comprising a transponder and a tag antenna includes the acts of: providing a plurality of inductors, each inductor being associated with a capacitor to form a resonant tank circuit, wherein each resonant tank circuit has a first resonant frequency in the presence of metal and a second resonant frequency in the absence of metal; placing the RFID tag in proximity of the plurality of inductors; determining a resonant frequency for each of the resonant tank circuits as affected by the proximity of the RFID tag; comparing each determined resonant frequency to the first and second resonant frequencies to determine an image of the RFID antenna.

DETAILED DESCRIPTION OF THE INVENTION

Figure 1:
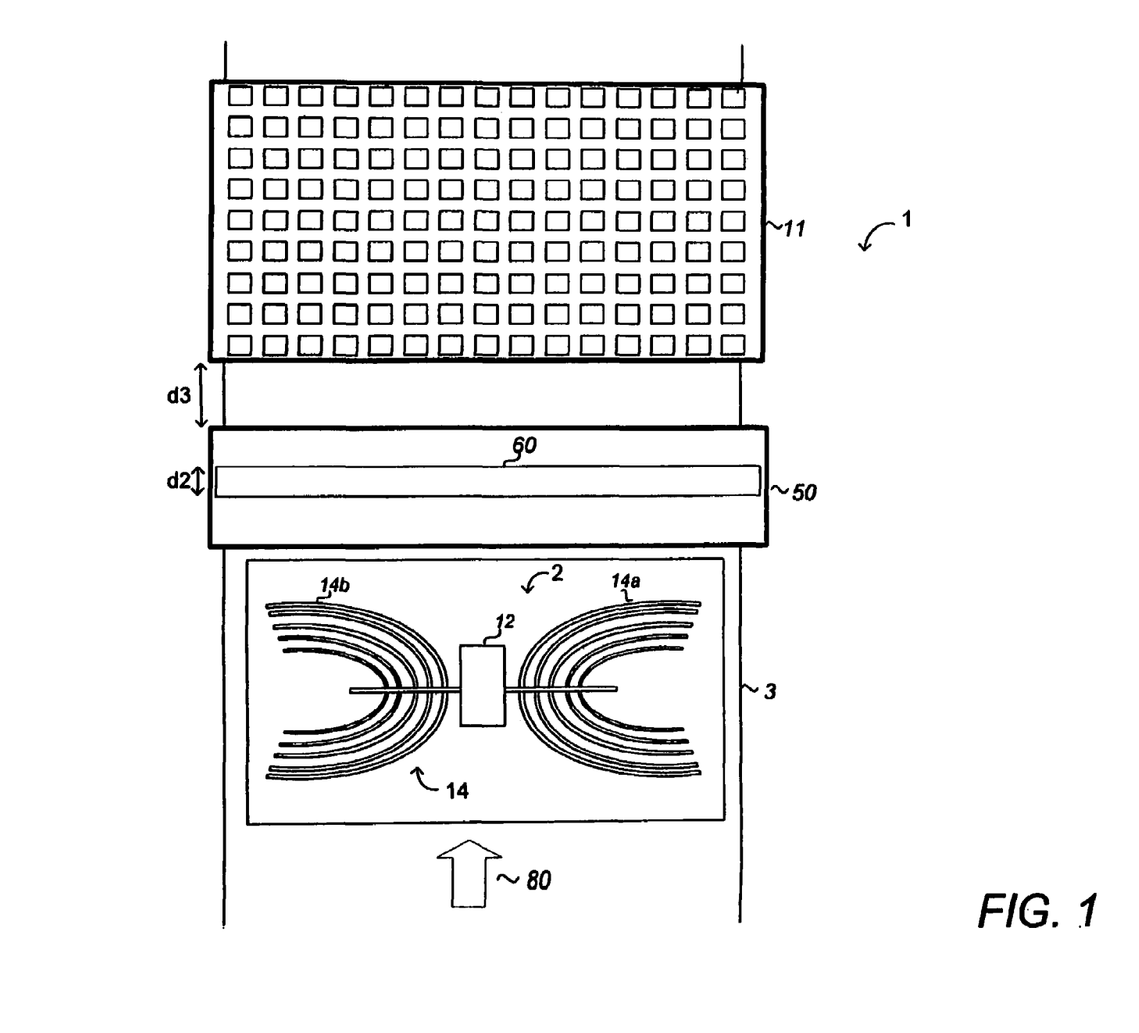
FIG. 1 illustrates an exemplary system including an imager and a capacitive encoder for communication with an RFID tag in accordance with an embodiment of the invention.

With reference to FIG. 1, an exemplary system 1 is shown that includes an RFID tag imager subsystem 50 and a capacitive encoder 11. As known in the art, RFID tags such as an RFID tag 2 are typically provided on a roll 3. Roll 3 includes a backing such as paper or plastic on which the RFID tags are temporarily affixed using tape or similar means. System 1 may be integrated with a bar code printer (not illustrated) such that as goods are processed, system 1 encodes an RFID tag 2 from the roll, affixes the RFID tag 2 to the package, and also prints a corresponding bar code label for the package. As additional packages or goods are processed, additional RFID tags (not shown) are fed to system 1 from the roll in direction 80.

Figure 2A:
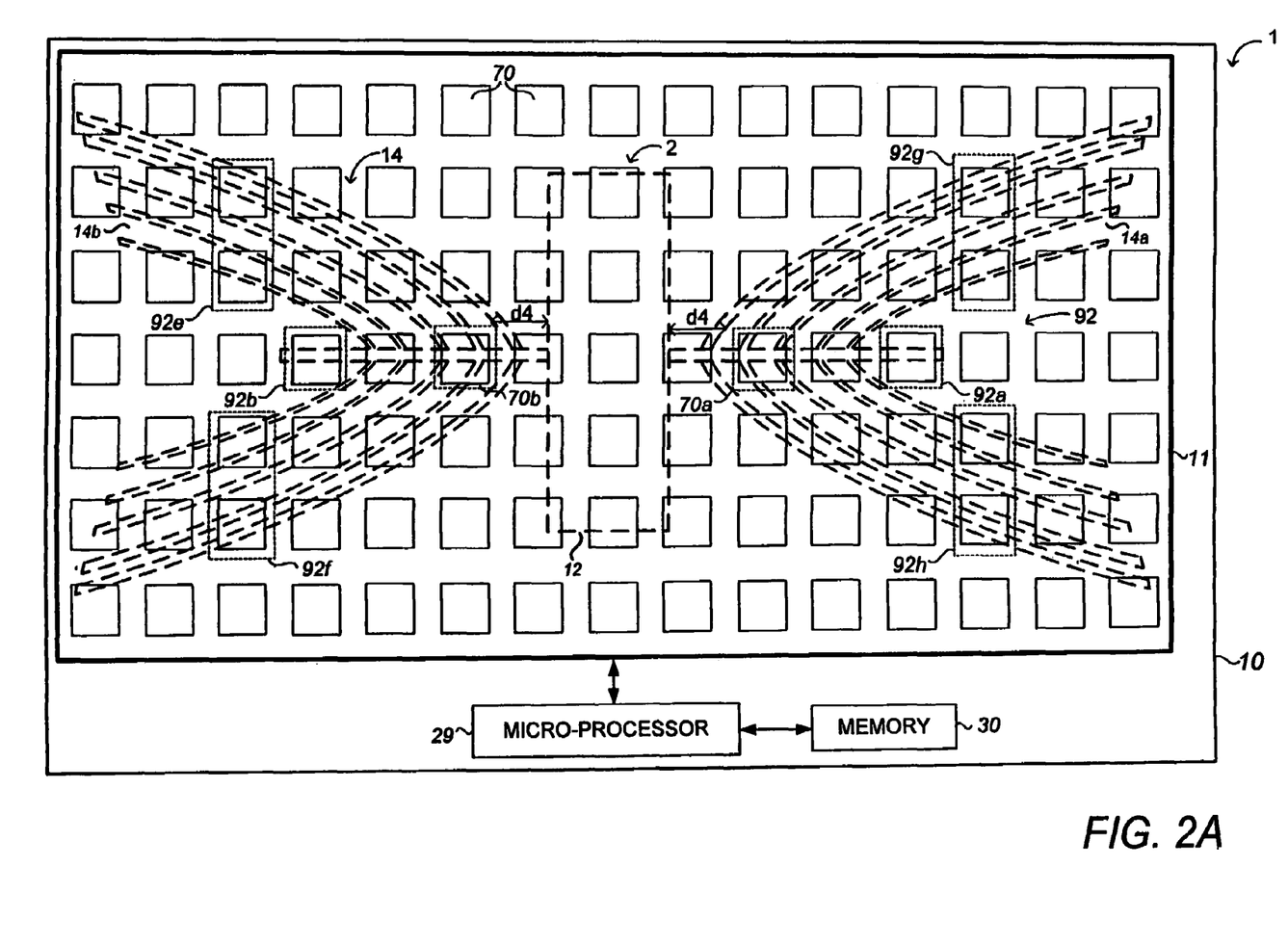
FIGS. 2A–B illustrate the capacitive encoder of FIG. 1 encoding an RFID tag in accordance with embodiments of the invention.

RFID tag 2 includes a transponder 12 and a tag antenna 14 such as a patch antenna or a dipole antenna. In the exemplary embodiment shown in FIG. 1, tag antenna 14 is a dipole antenna having antenna wings 14a and 14b. As will be described further herein with respect to FIG. 2A and FIG. 2B, capacitive encoder 11 includes a plurality of elements such as conductive plates 70 that may be selectively excited so as to encode RFID tag 2. In FIG. 2A, the RFID tag 2 (shown in phantom) has been moved adjacent to capacitive encoder 11 such that if plates 70a and 70b are excited with a signal within the operating bandwidth of the RFID tag 2, the RFID tag 2 may be encoded (or alternatively, may be read). The selection of which plates 70 within the array that should encode the RFID tag 2, however, depends upon the topology of the tag antenna 14. Advantageously, system 1 needs no prior knowledge of the antenna topology. In that regard, an operator of system 1 need not be concerned with configuring system 1 responsive to the particular RFID tag being encoded.

To determine which plates 70 should be selected for excitation, system 1 may first image the tag antenna 14 using imager subsystem 50. For example, imager subsystem 50 may image tag antenna 14 in successive portions 60 of width $d_2$ as shown in FIG. 1. In that regard, roll 3 upon which the RFID tag 2 is mounted could be drawn through system 1 at either a constant or changing rate. As the RFID tag 2 passes by imager subsystem 50, the data from the successive portions being imaged are captured and processed by a microprocessor 29 shown in FIG. 2A. Microprocessor 29 processes the resulting data to form a complete image of the tag antenna 14. Based upon this image, microprocessor 29 may then run an electromagnetic modeling algorithm such as a finite element analysis/method of moments algorithm to determine the areas of greatest surface currents within antenna 14 in response to an excitation. For example, with respect to dipole wings 14a and 14b, an area of maximum current excitation would be similarly located within each dipole half. Capacitive encoder 11 may then excite at least one capacitive plate 70 corresponding to each area of maximum current excitation. For example, with respect to dipole half 14b, capacitive plate 70b may be considered to be most closely positioned with the area of maximum current excitation. Similarly, capacitive plate 70a may be considered to be most closely positioned with the area of maximum current excitation in dipole half 14a. The determination of when to excite plates 70a and 70b will depend upon the rate of progress for the RFID tag 2 with respect to system 1 as well as the distance $d_3$ between imager subsystem 50 and capacitive encoder 11. It will be appreciated that the selection of a single plate for each dipole half is for illustration purposes only—depending upon the antenna topology, more than one plate 70 for each area of maximum current excitation may be necessary.

Figure 2B:
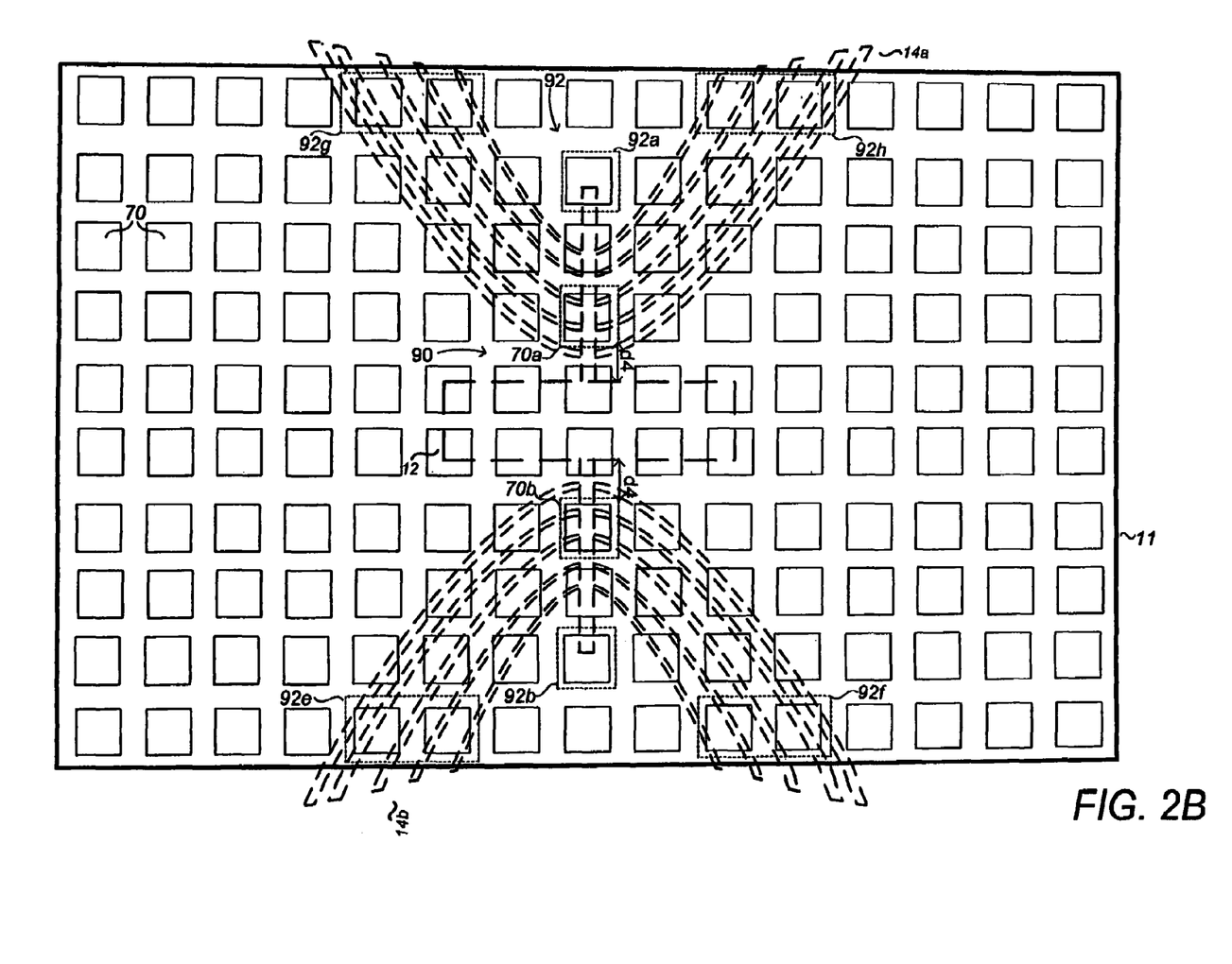

Consider the advantages of system 1: Regardless of the orientation and topology of the tag antenna 14, system 1 may image the tag antenna 14, model its electromagnetic properties based upon the imaging to determine maximum current excitation areas, and select plates 70 accordingly to properly encode the RFID tag 2. Thus, should the RFID tag 2 be oriented differently such as being rotated approximately 90 degrees as shown in FIG. 2B, capacitive encoder 11 may still make a proper selection of a subset of plates 70 for encoding of the RFID tag 2. Thus, based upon data from imager subsystem 50, processor 29 will select plates 70a and 70b as discussed with respect to FIG. 2A. As seen in FIG. 2B, however, the locations of plates 70a and 70b have changed corresponding to the new orientation of the tag antenna 14.

In another exemplary embodiment, imager subsystem 50 may include an optics subsystem (not shown) comprising a light source, such as a lamp, to illuminate the RFID tag 2 with illuminating radiations in the visible spectrum, such as visible light, and optical lens for receiving the reflected visible light from the RFID tag 2.

Because of the electromagnetic modeling performed by processor 29, capacitive encoder 11 may perform other operations on the RFID tag 2 besides either encoding or interrogating. For example, based upon modeling the currents excited in the tag antenna 14, processor 29 may determine the radiated fields from the tag antenna 14 that would be excited by the encoding or interrogating signals driven to plates 70a and 70b. Because the RFID tags may be affixed to roll 3 as discussed previously, the radiation from one RFID tag may affect adjacent RFID tags. As the sensitivity of RFID tags is increased, the received radiation in the adjacent tags may be such that these tags are also encoded by capacitive encoder 11. To prevent such stray radiation and undesired encoding of adjacent RFID tags, processor 29 may select subsets 92 of plates 70 to be excited with a signal that will nullify any radiation from the encoded RFID tag 2. For example, with respect to dipole half 14a, a subset 92a consisting of just one plate may be selected to be driven with a nullifying signal. Alternatively, depending upon the desired nullifying effect, subsets 92g or 92h may be selected. Similarly, with respect to dipole half 14b, subsets 92b, 92e, and 92f represent exemplary plate selections for a nullifying signal excitation.

In embodiments in which capacitive encoder 11 not only encodes or interrogates but also nullifies electromagnetic radiation from the excited RFID tag 2, a total of four signals should be available to drive any given plate 70. For example, suppose a plate 70 is selected for the encoding signal. Depending upon which dipole half the selected plate 70 corresponds to, the plate may be driven with a signal within the operating bandwidth of RFID tag 2. For example, with respect to FIG. 2B, plate 70a could be driven with this signal whereas plate 70b may be driven with the same signal shifted in phase by 180 degrees. These two signals may be denoted as A and A*.

In general, signals A and A* need merely be out of phase by some appreciable amount. For example, it may readily be seen that if signals A and A* are completely in phase, no excitation of RFID tag 2 will ensue. As A* is shifted out of phase with respect to A, a greater and greater amount of excitation may ensue. For example, if A* is shifted in phase by 135 degrees with respect to A, the excitation power will be approximately 70 percent of the maximum achievable power, which corresponds to a phase shift of 180 degrees.

Figure 3:
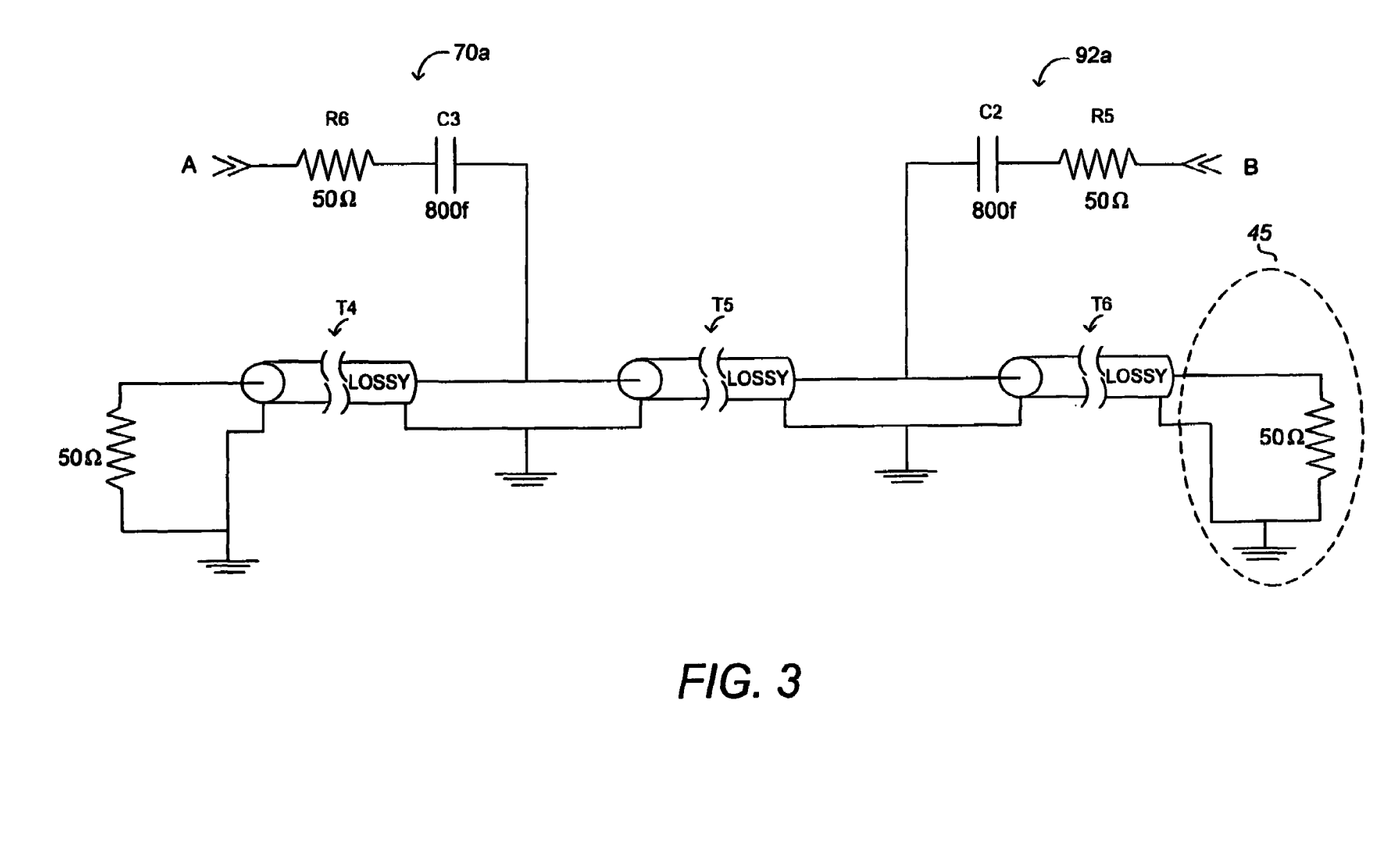
FIG. 3 is a schematic illustration of a simplified electromagnetic model for an RFID tag antenna, wherein the antenna is excited with both an encoding signal A and a nullifying signal B.

Regardless of the phase relationship between signals A and A*, processor 29 may calculate a nullifying signal that will have some phase and power relationship to signal A. This nullifying signal may be represented as signal B. For example, suppose that after imaging and electromagnetic modeling of RFID tag antenna 14, processor 29 simplifies the resulting electromagnetic model as seen in FIG. 3. In this model, the electrical properties of the tag antenna 14 are represented by lossy transmission line portions T4, T5, and T6. These lines would have some characteristic impedance that would depend upon the electrical properties of the tag antenna 14. The input to T4 would be the excitation point from transponder 12 (FIG. 1). The output of T6 represents the field at the "end" of the tag antenna half 14a. The actual location of the end of T6 depends upon the RFID tag orientation on roll 3. For example, as seen in FIG. 2A, the RFID tags may be orientated in a side-to-side fashion whereas as seen in FIG. 2B, the RFID tags may be oriented in an end-to-end fashion. It will be appreciated that the field between adjacent RFID tags is the field of primary concern. Thus, the end of T6 represents the location of this field.

Regardless of whether the orientation is of the RFID tag 2 is side-to-side, end-to-end, or some other arrangement, the electrical model shown in FIG. 3 may be used to represent the radiation between adjacent RFID tags. In this model, the capacitive plates 70 are also modeled. Plate 70a is represented by resistor R6 and capacitor C3. Similarly, plate 92a is represented by resistor R5 and capacitor C2. Based upon this electromagnetic model, the relationship between nullifying signal B and encoding signal A may be derived such that no fields are excited in region 45, at the end of transmission line T6. Analogous calculations may be performed to derive a nullifying signal B* for encoding signal A*. A bus structure to support the feed and selection of signals A, A*, B, and B* to each capacitive plate will now be discussed.

Figures 4A, 4B:
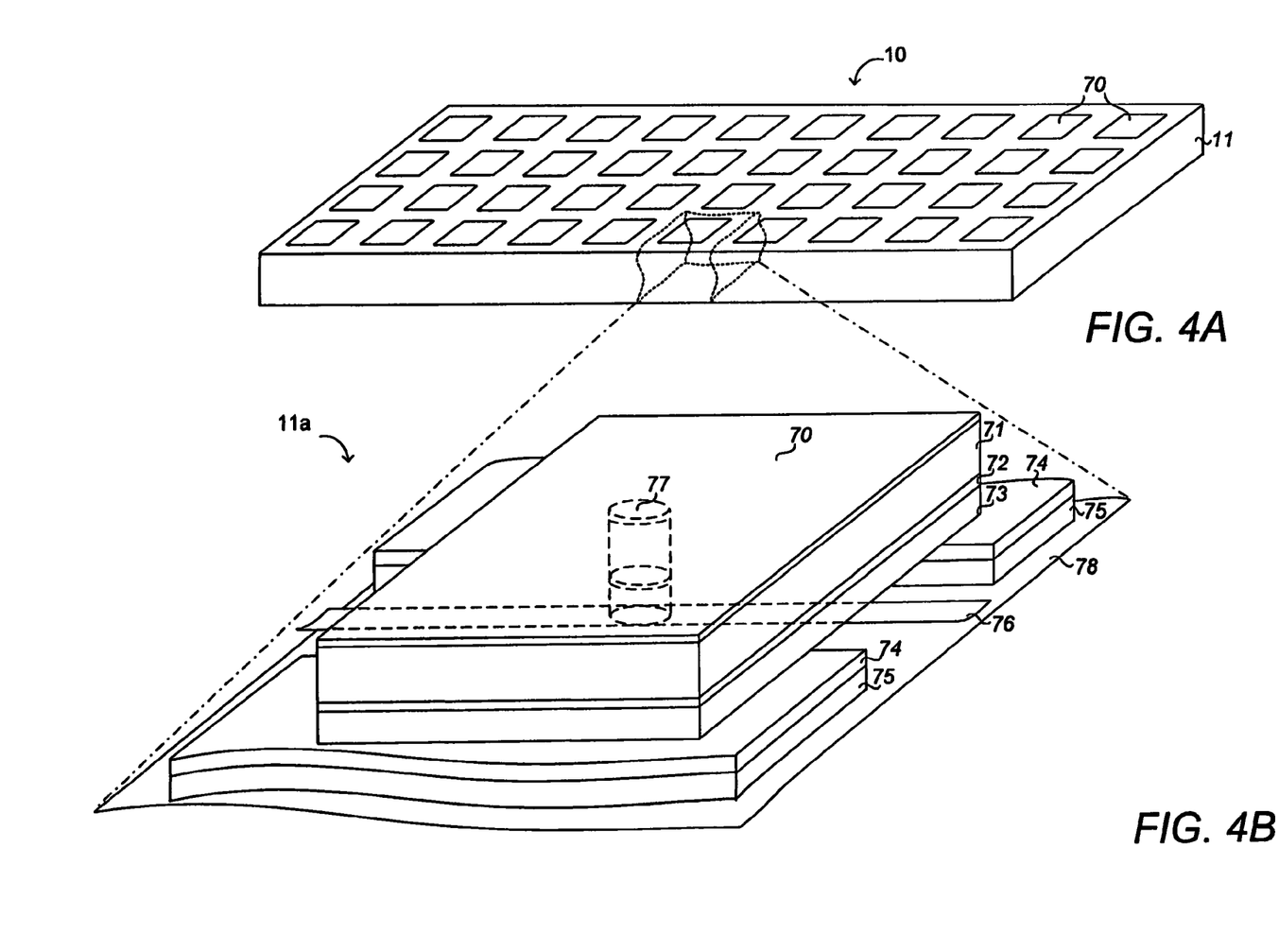
FIG. 4A. is a perspective view of the capacitive encoder of FIGS. 2A and 2B.
FIG. 4B is a cross-sectional view of a portion of the capacitive encoder of FIG. 4A.

Turning now to FIG. 4A and FIG. 4B, a capacitive encoder 11 is illustrated to demonstrate an exemplary embodiment that supports the selection of signals A through B* for a particular capacitive plate. Each conductive/capacitive plate 70 is formed on a dielectric layer 71. To shield plates 70 from a driving network (discussed further with respect to FIG. 5), dielectric layer 71 overlays a ground shield 72. Ground shield 72 is separated from a feed plane 78 supporting the driving network. For example, the network may be formed using planar waveguides. For illustration clarity, only one waveguide 76 is illustrated. In a row/column arrangement of plates 70 such as shown in FIG. 4A, each row and/or column may be associated with a corresponding row or column waveguide 76. In one embodiment, the row and column waveguides may intersect and thus lie on the same plane. To carry the four signals A through B*, a separate feed plane would carry another row and column waveguide formation. Alternatively, different feed plane layers 78 may be used for each signal. Coupling between adjacent waveguides may be minimized through the incorporation of ground shields 74 in the feed plane 78 as supported by dielectric layers 75 and 73. To couple signals in waveguide 76 to plate 70, via feed contact 77 (shown in phantom) may be formed in the intervening layers.

Figure 5:
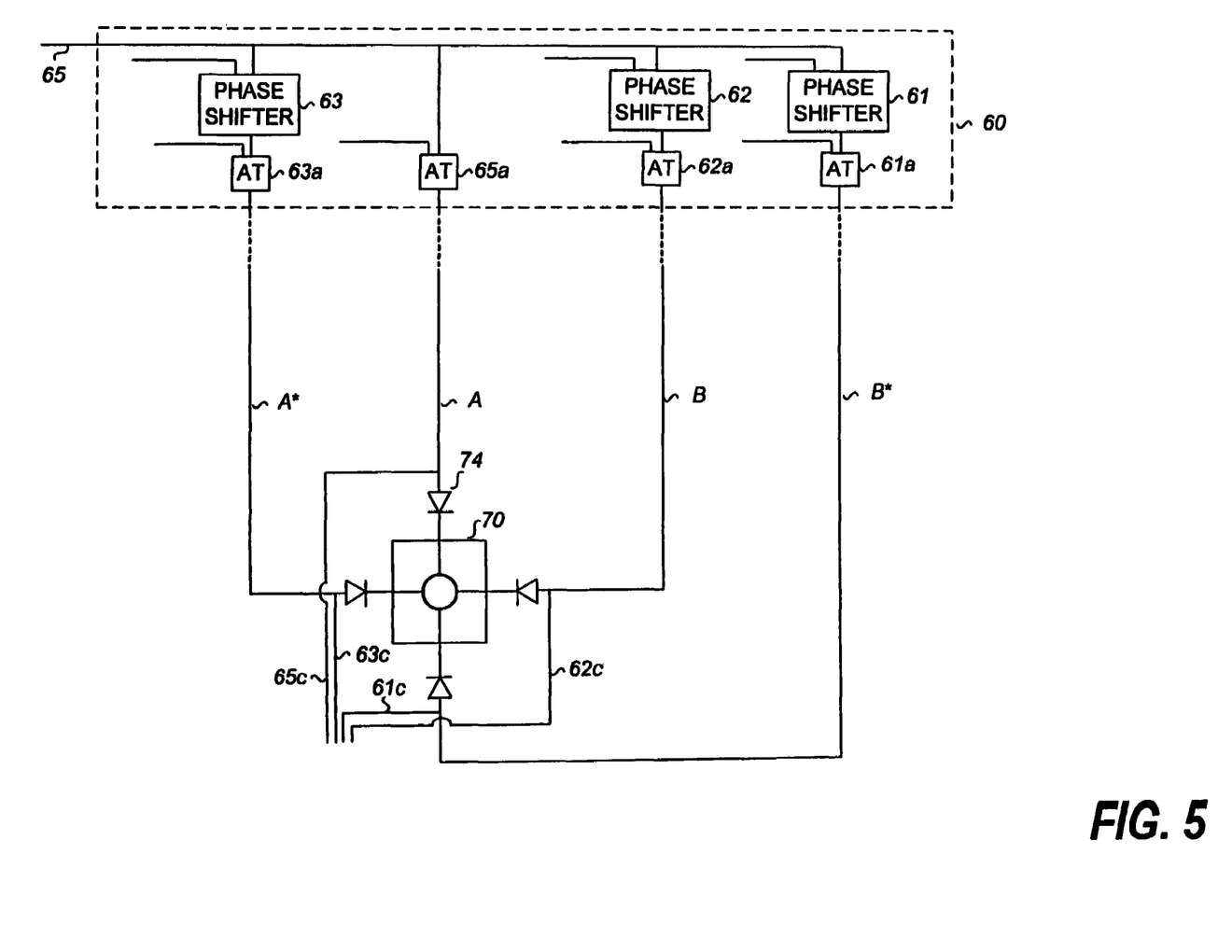
FIG. 5 is a schematic illustration of the driving network supported within the capacitive encoder of FIGS. 4A–B.

Turning now to FIG. 5, further aspects of the driving network are illustrated. As discussed previously, each plate 70 may be driven with one of four available signals. To generate these signals, capacitive encoder 11 may include a programmable phase shifter subsystem 60, such as one comprising 5-bit phase shifters 61, 62 and 63 coupled to programmable attenuators 61a, 62a and 63a, respectively, and adapted to receive an operating signal 65. Operating signal 65 may be programmably attenuated in attenuator 65a to form the driving signal A as discussed previously. To generate the driving signal A* that is 180 degrees out of phase with respect to signal A, the operating signal 65 may be phase-shifted by phase-shifter 63 and programmably attenuated by attenuator 63a. Similarly, operating signal 65 may be programmably phase-shifted in phase-shifters 62 and 61 and then programmably attenuated in attenuators 62a and 61a to form nullifying signals B and B*. Signals A, A*, B, and B* may be coupled through conductors such as waveguide 76 to a selected plate's 70 via feed contact 77. For example, to select a plate 70, a corresponding switch such as a diode 74 may be driven into a conductive state.

As also shown in FIG. 5, the operating signal 65 is phase-shifted by phase-shifter 62 into a signal B that is 180 degree out of phase with respect to the attenuated operating signal A, for maximizing signal throughput during encoding and communicating, as described above. In addition, operating signal 65 is also inputted into phase shifters 61, and 63 for phase-shifting by a predetermined phase angle into signals B* and A*, respectively. In another exemplary embodiment, the programmable grid antenna subsystem is operable to receive an inputted phase, such as a predetermined phase inputted by a user.

Figure 6:
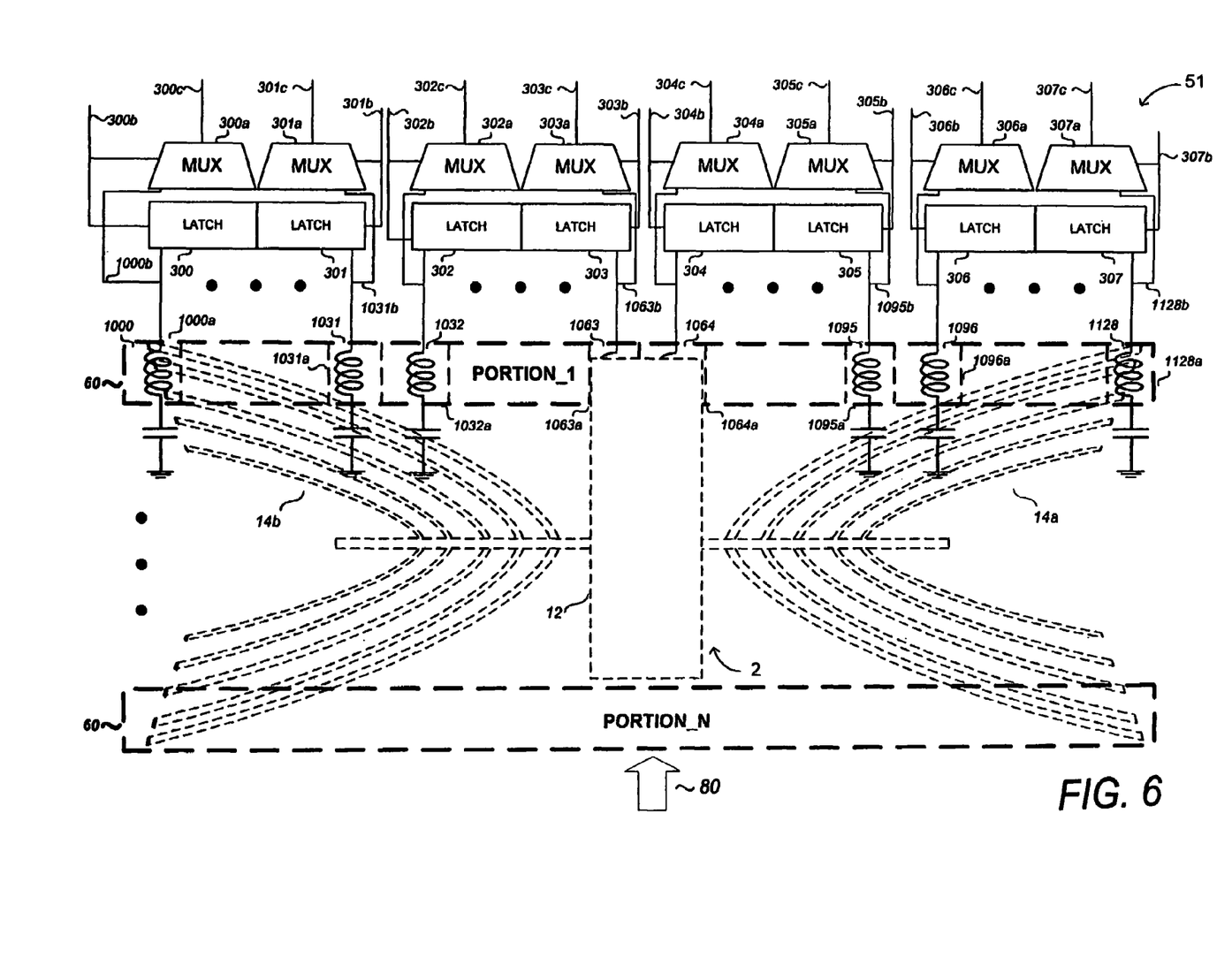
FIG. 6 is a schematic illustration of an RFID tag imager in accordance with an embodiment of the invention.

As discussed previously, the phase and amplitude relationship of nullifying signals B and B* to corresponding encoding signals A and A* depends upon the electromagnetic modeling which in turn depends upon the imaging provided by imager subsystem 50. Imager subsystem 50 may be constructed using either an optical or inductive sensors. An inductive embodiment of imager subsystem 50 is illustrated in FIG. 6. As shown in FIG. 6, the inductor array subsystem 51 comprises an exemplary array of 128 inductors, such as inductors 1000–1128 juxtaposed in a linear formation. Each inductor associates with a corresponding capacitor to form a resonant tank circuit. Each inductor corresponds to a pixel of the portion 60 being imaged as discussed with respect to FIG. 1. It will thus be appreciated that the dimensions of inductors 128 determine the pixel size and hence the resolution of the resulting image. The necessary resolution in turn depends upon the conductor width and layout complexity of the tag antenna 14. In one embodiment, the pixel size is approximately 0.3 mm. Each of inductors 1000–1128 is operable to generate a corresponding induction field, such as induction fields 1000a–1128a corresponding to inductors 1000–1128, respectively. For simplicity, only a subset of the inductors 1000–1128 and their corresponding induction fields 1000a–1128a are shown in FIG. 6. As shown in FIG. 6, an RFID tag 2 (shown in phantom) is placed in proximity of the imager subsystem 50, such as under the imager subsystem 50. The presence of each metallic part in the RFID tag 2 is then "felt" by each inductor via a change in the resonant frequency of the corresponding resonant tank circuit. A signal representing the change in the frequency pattern of an affected inductor, such as inductor 1000, is then transmitted from the affected inductor via one of the transmission lines 1000b–1128b corresponding to the inductors 1000–1128, respectively, such as via transmission line 1000b corresponding to inductor 1000. Imager subsystem 50 includes a signal processor to determine the change in resonant frequency for each resonant tank circuit. Prior to imaging, the resonant frequency for each tank would be determined in the presence of metal (such as a copper plate) and also in the absence of any metal. Based upon the resonant frequency measured in the presence of tag antenna 14, the relative "amount" of metal present in the corresponding image pixel may be assigned as a grey scale between the two resonant frequency extremes (corresponding to no metal or all metal). A processor such as processor 29 may then analyze the various grey scales for the image to determine the topology of tag antenna 14.

In an exemplary embodiment of the present invention, to reduce a detrimental overlapping of induction fields of adjacent inductors, such as overlapping of induction fields 1031a and 1032a of adjacent inductors 1031 and 1032, inductors 1000–1128 are made operational in a predetermined on/off pattern so that adjacent inductors are not operational at the same time. In the exemplary embodiment of FIG. 6, every $32^{nd}$ inductor in the inductors 1000–1128 is made operational at a given time, such as for example first making inductors 1000, 1032, 1064, and 1096 operational and then powered down before moving to a different set of inductors, such as to inductor 1031, 1063, 1095 and 1128, and repeating the process until all the inductors 1000–1128 have been made operational at one point in the foregoing pattern. By applying the forgoing pattern in rapid succession to each inductor set in the inductors 1000–1128, a virtual line scan of the affected inductors is obtained while minimizing the risk of detrimental overlapping of induction fields of adjacent inductors.

As shown in FIG. 6, in an exemplary implementation of the above-described pattern, a set of latches 300–307 are used for regulating the application of operating power to the inductors 1000–1128. In the exemplary embodiment shown in FIG. 6, latches 300–307 are 16 bit latches, each controlling a subset of sixteen inductors. A set of multiplexers 300a–307a adapted to receive a subset of sixteen of transmission lines 1000b–1128b are also used to reduce the total number of transmission lines exiting the inductor array subsystem 11, since at any give time only a subset of the inductors 1000–1128 are made operational and thus only a corresponding subset of the transmission lines 1000b–1128b are in use. As also shown in FIG. 6, each of latches 300–307 is paired to a respective one of multiplexers 300a–307a, via a respective one of control lines 300b–307b such that for example when latch 300 is instructed by control line 300b to provide operating power to inductor 1000, the multiplexer 300a is also instructed by control line 300b to select transmission line 1000b so to output the signal received from inductor 1000.

Figure 7:
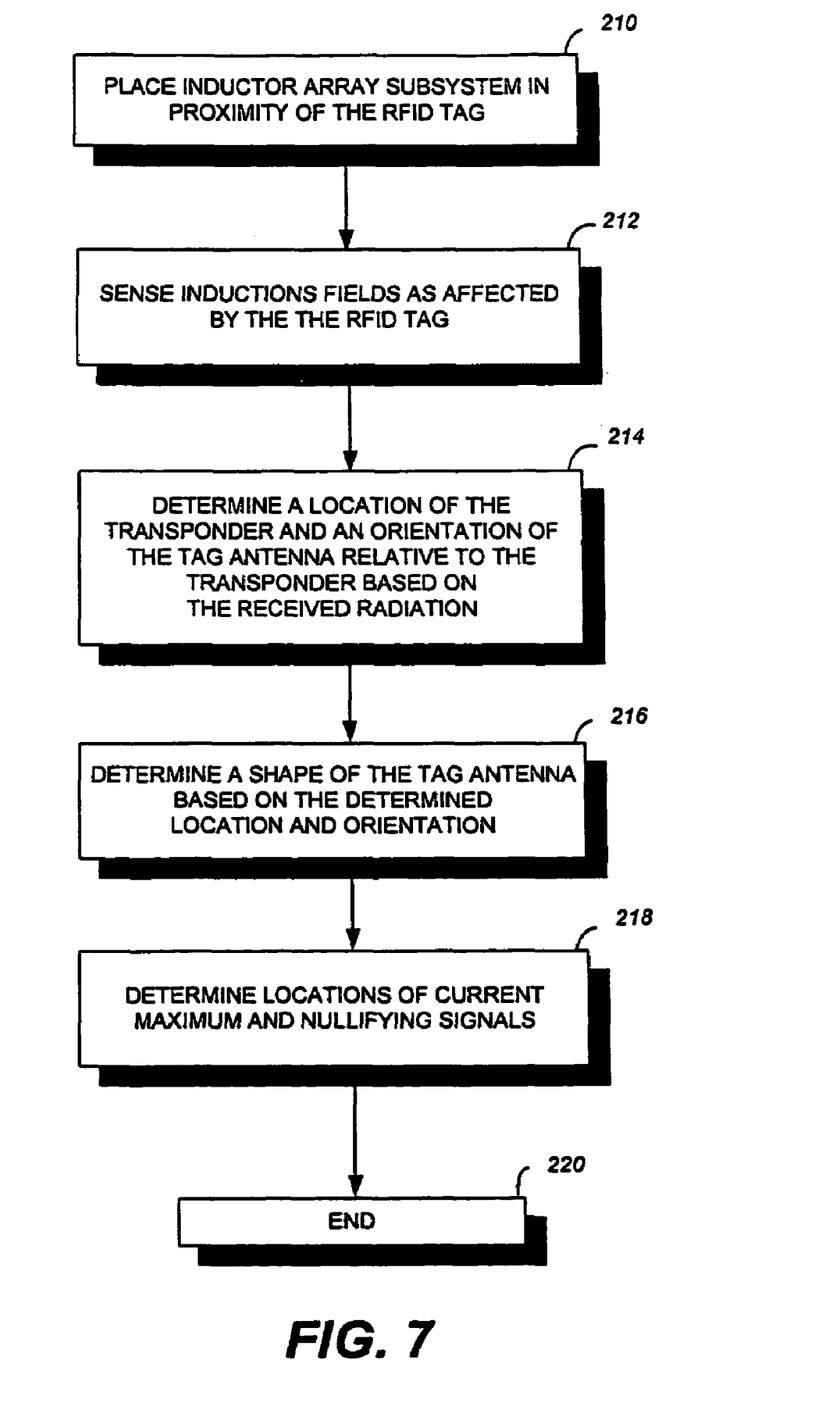
FIG. 7 is a flow diagram illustrating a method of imaging an RFID tag in accordance with an embodiment of the invention.

Operation of imager subsystem 50 may be better understood with reference to the flowchart of FIG. 7. As shown in FIG. 7, the process begins in block 210 where the inductor array subsystem 51 is placed in proximity of the RFID tag 2, such at a distance above the RFID tag 2. Next, in block 212, the inductions fields as affected by the metal within the RFID tag 2 are sensed. Next, in block 214, a location of the transponder 12 and an orientation 15 of the tag antenna 14 relative to the transponder 12 is determined by the microprocessor 29 based on the data received from the imager 11 such as respective outputs 300c–307c of multiplexers 300a–307a comprising signals representing the change in the frequency pattern of affected inductors 1000–1128. In an exemplary embodiment of the present invention, the orientation of the tag antenna 14 relative to the transponder 12 is determined based on a set of predetermined axes, such as in respect to predetermined assembly-line representations of x-axis and y-axis in a Cartesian coordinate system. Next, in block 216, a shape of the tag antenna 14 is determined based on the location of the transponder 12 and orientation of the tag antenna 14 relative to the transponder 12, as previously determined in block 214.

The flow then proceeds to block 218, in which based on the shape of the RFID tag 2 determined in block 216, the locations of current maximums, such as corresponding to plates 70a and 70b in FIGS. 2A and 2B, are determined using electromagnetic modeling. In addition, the phase and amplitude relationship for the nullifying signals B and B* are also determined as well as the corresponding locations 92 where the nullifying signals should be applied are determined in block 218. It will be appreciated that processor 29 may store the electromagnetic models of expected RFID tags. Based upon the imaging data provided by imager subsystem 50, processor 29 then merely needs to recall the electromagnetic data for the recognized RFID tag 2 in order to perform the operations described in block 218. The flow then proceeds to block 220 in which the overall process ends.

It will be appreciated that system 1 may also image and encode RFID tags using patch antennas rather than dipoles. It should be noted that the various features of the foregoing embodiments were discussed separately for clarity of description only and they can be incorporated in whole or in part into a single embodiment of the invention having all or some of these features.

What is claimed is:

1. A system for obtaining an image of an RFID tag comprising a transponder and a tag antenna, the system comprising:
    a plurality of inductors, each inductor being associated with a capacitor to form a resonant tank circuit, wherein each resonant tank circuit has a first resonant frequency in the presence of metal and a second resonant frequency in the absence of metal;
    a signal processor configured to determine a resonant frequency for each resonant tank circuit in the presence of the tag antenna; and
    a processor configured to compare the resonant frequency of each resonant tank circuit to the first and second resonant frequency to determine an image of the tag antenna.

2. The system as defined in claim 1, wherein the plurality of inductors is a linear array of inductors.

3. The system as defined in claim 1, wherein each inductor represents a pixel of the image and wherein the processor is configured to assign a grey scale to each pixel based the comparison of the resonant frequency to the first and second resonant frequencies such that the image comprises a plurality of pixels of varying grey scales.

4. The system as defined in claim 1, wherein the system is further configured to compare the image to a set of predetermined images so as to classify the type of tag antenna.

5. The system as defined in claim 4, wherein the system is further configured to identify, based upon the classification of the type of tag antenna, areas of maximum current excitation in the tag antenna.

6. The system as defined in claim 5, wherein the tag antenna is a dipole antenna having a first area of maximum current excitation in a first dipole half and a second area of maximum current excitation in a second dipole half, the system further comprising:
   a capacitive encoder having a plurality of conductive elements, wherein the system is configured to select a first conductive element from plurality based upon its proximity to the first area of maximum current excitation and to select a second conductive element from the plurality based upon its proximity to the second area of maximum current excitation, the capacitive encoder being configured to drive an RF encoding signal into the first conductive element and to phase shift the RF encoding signal and drive the phase-shifted RF encoding signal into the second conductive element so as to capacitively encode the RFID tag.

7. The system as defined in claim 6, wherein the plurality of conductive elements comprise a plurality of patches on a surface of a dielectric substrate.

8. The system as defined in claim 1, wherein the system is further configured to analyze the image to determine locations of maximum current excitation on the tag antenna.

9. The system as defined in claim 8, wherein the system analytically determines the locations of maximum current excitation based on a Finite Element Analysis and a Method of Moments analysis.

10. The system as defined in claim 9, wherein the tag antenna is a dipole antenna having a first area of maximum current excitation in a first dipole half and a second area of maximum current excitation in a second dipole half, the system further comprising:
    a capacitive encoder having a plurality of conductive elements, wherein the system is configured to select a first conductive element from plurality based upon its proximity to the first area of maximum current excitation and to select a second conductive element from the plurality based upon its proximity to the second area of maximum current excitation, the capacitive encoder being configured to drive an RF encoding signal into the first conductive element and to phase shift the RF encoding signal and drive the phase-shifted RF encoding signal into the second conductive element so as to capacitively encode the RFID tag.

11. The system as defined in claim 10, wherein the plurality of conductive elements comprise a plurality of patches on a surface of a dielectric substrate.

12. A method for obtaining an image of an RFID tag comprising a transponder and a tag antenna, the method comprising:
    providing a plurality of inductors, each inductor being associated with a capacitor to form a resonant tank circuit, wherein each resonant tank circuit has a first resonant frequency in the presence of metal and a second resonant frequency in the absence of metal;
    placing the RFID tag in proximity of the plurality of inductors;
    determining a resonant frequency for each of the resonant tank circuits as affected by the proximity of the RFID tag;
    comparing each determined resonant frequency to the first and second resonant frequencies to determine an image of the RFID antenna.

13. The method as defined in claim 12, further comprising: comparing the image of the RFID antenna to a set of predetermined images so as to classify the type of tag antenna.

14. The method as defined in claim 12, further comprising: analyzing the image using a finite element/method of moments analysis to electromagnetically model the RFID antenna.

15. The method as defined in claim 14, further comprising: based upon the electromagnetic model, identifying areas of maximum current excitation in the RFID antenna.

* * * * *